US006941219B2

United States Patent
Avery, Jr. et al.

(10) Patent No.: US 6,941,219 B2
(45) Date of Patent: Sep. 6, 2005

(54) METHOD FOR RECREATING VALID CALIBRATION DATA FOR AN ENGINE CONTROL MODULE

(75) Inventors: Richard M. Avery, Jr., West Bloomfield, MI (US); Dennis Letang, Canton, MI (US); Leopold Super, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 114 days.

(21) Appl. No.: 10/675,834

(22) Filed: Sep. 30, 2003

(65) Prior Publication Data

US 2005/0071075 A1 Mar. 31, 2005

(51) Int. Cl.[7] ............................................. G06F 12/00
(52) U.S. Cl. ...................... 701/115; 711/162; 711/163
(58) Field of Search ................................. 711/162, 163, 711/173; 701/114, 115, 35

(56) References Cited

U.S. PATENT DOCUMENTS

| | | | |
|---|---|---|---|
| 4,580,222 A | | 4/1986 | Fujii |
| 4,730,256 A | * | 3/1988 | Niimi et al. ................. 701/115 |
| 5,203,000 A | | 4/1993 | Folkes et al. |
| 5,426,585 A | | 6/1995 | Stepper et al. |
| 5,477,827 A | * | 12/1995 | Weisman et al. ........... 123/436 |
| 5,497,330 A | | 3/1996 | Ishida |
| 5,925,140 A | * | 7/1999 | Hudson ......................... 714/52 |
| 6,046,937 A | * | 4/2000 | Komori et al. ......... 365/185.04 |
| 6,168,321 B1 | | 1/2001 | Tanaka et al. |
| 6,463,373 B2 | | 10/2002 | Suganuma et al. |
| 6,505,105 B2 | * | 1/2003 | Allen et al. .................... 701/33 |
| 6,598,114 B2 | * | 7/2003 | Funakoshi .................... 711/103 |
| 6,633,807 B2 | * | 10/2003 | Augsburger et al. ......... 701/115 |
| 6,725,346 B1 | * | 4/2004 | Ganesh et al. .............. 711/163 |
| 6,766,425 B2 | * | 7/2004 | Deutscher et al. .......... 711/163 |
| 6,804,752 B2 | * | 10/2004 | Patterson et al. ........... 711/163 |
| 2003/0225493 A1 | * | 12/2003 | Patterson et al. .............. 701/45 |

FOREIGN PATENT DOCUMENTS

| | | |
|---|---|---|
| EP | 0 561 271 A2 | 11/1993 |
| WO | WO 02/069627 A3 | 9/2002 |

OTHER PUBLICATIONS

ECMA–319, "Data Interchange on 12, 7 mm 384–Track Magnetic Tape Cartridges—Ultrium–1 Format," Annex D, Jun. 2001.

"Extensible Structure For Managing System Asset Information In A Non–Volatile Storage Element :EAIA (Enhanced Asset Information Area," IBM Research Disclosure 421136, May 1999.

* cited by examiner

Primary Examiner—Henry C. Yuen
Assistant Examiner—Arnold Castro
(74) Attorney, Agent, or Firm—Brooks Kushman P.C.

(57) ABSTRACT

An engine control module, and method for operating the same for controlling an internal combustion engine. The engine control module comprising a processor for executing instructions to controlled the engine. The engine control module partitioning its memory used to store calibration data. The memory is partitioned into user-changeable and non-user-changeable portions. Only the user-changeable portions are repeatedly backed up. These portions are backed up such that the engine control module can recreate valid calibration data when a memory failure has occured and the engine control module.

20 Claims, 1 Drawing Sheet

METHOD FOR RECREATING VALID CALIBRATION DATA FOR AN ENGINE CONTROL MODULE

BACKGROUND OF THE INVENTION

1. Field of the Invention

The present invention relates to engine control modules, and in particular, to recreating valid calibration data when a non-volatile memory failure has occurred, for example, due to worn out memory locations.

2. Background Art

Engine control modules typically include volatile memory and non-volatile memory for storing calibration data. A microprocessor within the engine control module executes the stored calibration data to control an engine.

In operation, the non-volatile memory are copies typically used as back ups to the volatile memory copy. When needed, the calibration data values stored in the non-volatile memory can be copied to the volatile. A user can make changes to the calibration data in volatile memory, however, the user cannot typically change the non-volatile memory directly.

In the past, changes to the volatile memory calibration data prompted the engine control module to copy the entire volatile memory to the non-volatile memory. The engine control module would then verify the copied data, and if valid, another copy of the data would be made to a second non-volatile memory area. If not valid, implying that the first volatile memory may be faulty or power was removed during the copy process, etc., the data stored in the second non-volatile memory can be used to restore the volatile memory calibration data in order to maintain functionality. In this manner, a verified copy of the calibration data is available even if one of the non-volatile copies are invalid.

The copying of the calibration data causes repeated writing to the memories. Eventually, the memory will fatigue and fail. This is a problem. As such, there exists a need to provide a means to recreate valid data even if portions of the non-volatile memory fails.

In addition to memory wear-out problems, engine control modules are becoming more complex and require larger memories. The increased memory demand increases costs. This is also a problem. As such, there exists a need to limit memory while providing the necessary back-up protection in a cost effective manner.

SUMMARY OF THE INVENTION

It is, therefore, an object of the present invention to cost effectively limit the amount of non-volatile memory needed to provide adequate back-up protection for the calibration data.

One aspect of the present invention relates to an engine control module and corresponding method for operating the engine control module which copies only portions of the calibration data stored in the engine control module memory. Because only a portion of the calibration data is copied, only a portion of the total memory is repeatedly backed up, reducing the size and cost of the back up memory required.

The present invention includes partitioning a volatile memory and a first non-volatile memory of the engine control module. The partition separates the memory into user-changeable and non-user-changeable portions. Calibration data for engine control is stored on both the changeable and non-changeable portions, however, only the calibration data stored on the changeable portion can be changed by an end user.

The present invention only copies the changeable portion of the volatile memory to the first non-volatile memory if changes are made. The copying generally comprises copying the entire changeable portion of the volatile memory to the corresponding changeable portion of the first non-volatile memory.

Once the changes are copied, the engine control module verifies the changes, and may reboot. The user-changeable and non-user-changeable portions of the first non-volatile memory, i.e. the entire first non-volatile memory, are then copied back to the volatile memory for execution after rebooting if the data stored in the non-volatile memory is valid.

In addition, the user-changeable portion of the first non-volatile memory is copied to a second non-volatile memory for storage back up after rebooting. If a defect occurs to the changeable portion of the first non-volatile memory, proper operation can be maintained by copying to the volatile memory both (i) the data stored on the second non-volatile memory, which include the calibration data associated with the changeable portion of the memory, and (ii) the non-changeable instructions from the first non-volatile memory.

Optionally, data compression can also be used to further limit the amount of memory needed in the second non-volatile memory. The data is compressed when written to the second non-volatile memory and decompressed when read from it. The added time it takes to compress and decompress the data is negligible to the engine controller since writes and reads only occur right before a reboot or right after a reboot, not during engine operation.

DETAILED DESCRIPTION OF THE PREFERRED EMBODIMENT

Figure 1:
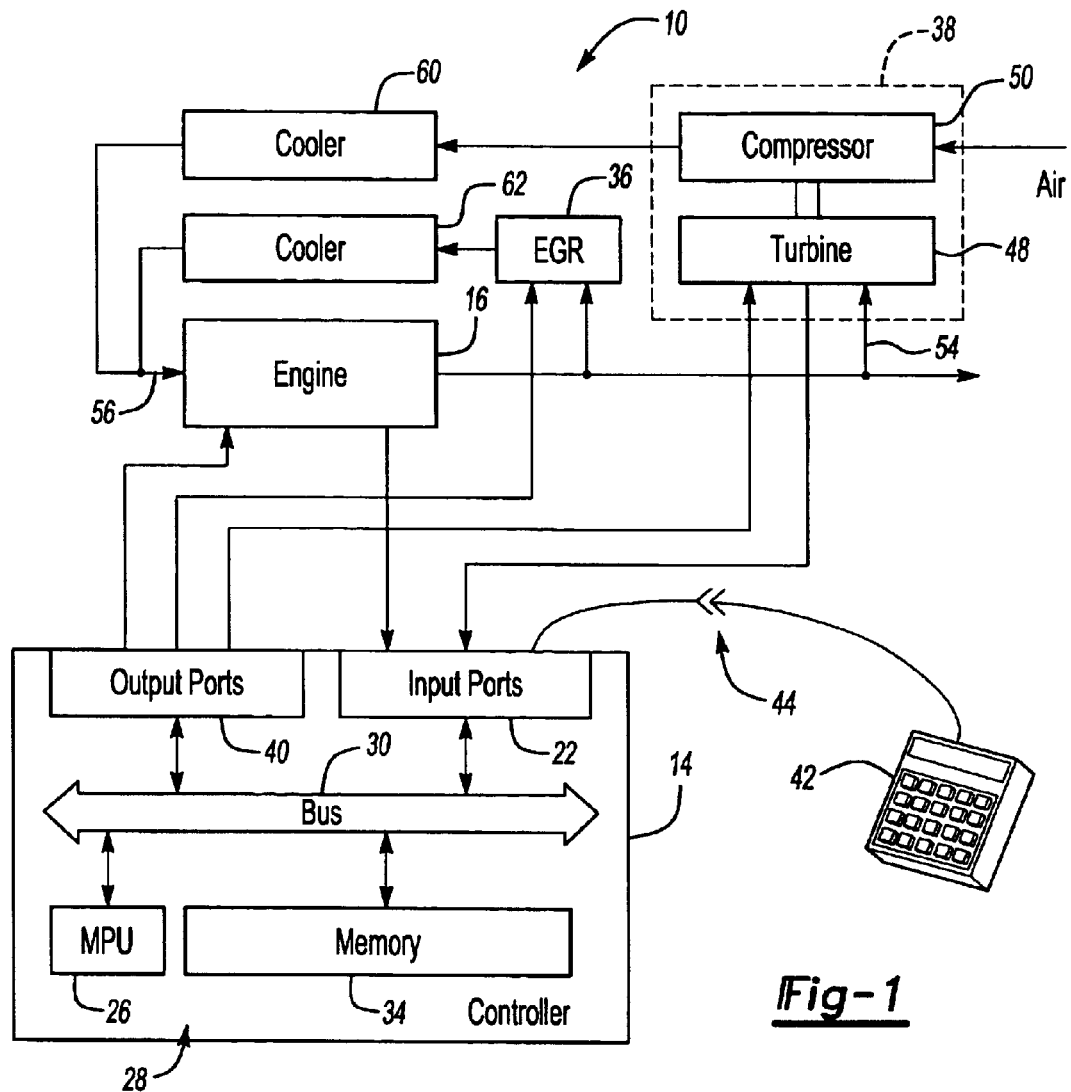
FIG. 1 illustrates an exemplary engine system controlled by an engine control module in accordance with the present invention.

FIG. 1 illustrates an exemplary engine system 10 controlled by an engine control module 14 in accordance with the present invention. The engine system generally relates to controlling an internal combustion engine 16. Engine 16 includes a plurality of cylinders disposed in an engine block.

In a preferred embodiment, engine 16 is a multi-cylinder compression-ignition internal combustion engine, such as a 4, 6, 8, 12, 16, or 24 cylinder diesel engine, for example. As will be appreciated by those of ordinary skill in the art, engine may be used in a wide variety of equipment for applications including on-highway trucks, construction equipment, marine vessels, and generators, among others.

While the present invention is described with reference to a diesel engine, one of ordinary skill in the art will recognize that the present invention is not necessarily limited to compression-ignition engines and may be easily applied to a variety of internal combustion engine technologies.

Engine includes an engine control module (ECM) 14. In operation, the engine control module 14 receives signals from various vehicle sensors and executes control logic embedded in hardware and/or software to control the engine. In a preferred embodiment, the engine control module is a DDEC controller available from Detroit Diesel Corporation, Detroit, Mich. Various other features of this control module are described in detail in a number of different U.S. patents assigned to Detroit Diesel Corporation.

Various sensors are in electrical communication with the engine control module 14 via input ports 22. Engine control module 14 preferably includes a microprocessor in communication with various computer readable storage media 28 via data and control bus 30. Computer readable storage media may include any of a number of known devices, including memory unit 34.

Memory unit 34 includes engine calibration data stored thereon. The data is executable by the engine control module 14 to perform methods of controlling the engine 16, including exhaust gas recirculation (EGR) valve 36 and turbocharger 38.

The programmable calibration data direct engine control module 14 to control the various systems and subsystems of the vehicle, with the instructions being executed by microprocessor 26. Input ports 22 receive signals from various sensors, and engine control module 14 generates signals at output ports 40 that are directed to the various vehicle components. A data, diagnostics, and programming interface 42 may also be selectively connected to engine control module 14 via a plug 44 to exchange various information therebetween.

As is appreciated by one of ordinary skill in the art, control logic may be implemented in hardware, firmware, software, or combinations thereof. Further, control logic may be executed by engine control module 14, in addition to by any of the various systems and subsystems of the vehicle cooperating with engine control module. Further, any of a number of known programming and processing techniques or strategy may be used to control an engine in accordance with the present invention.

Turbocharger 38 includes a turbine 48 and a compressor 50. The pressure of the engine exhaust gases causes the turbine 48 to spin. The turbine 48 drives the compressor 50, which is typically mounted on the same shaft. The spinning compressor 50 creates turbo boost pressure which develops increased power during combustion. The exhaust gases pass from engine 16 through exhaust passage and are selectively routed to turbine at inlet 54.

An exhaust gas recirculation system introduces a metered portion of the exhaust gases into intake manifold 56. The EGR system dilutes the incoming fuel charge and lowers combustion temperatures to reduce the level of oxides of nitrogen. The amount of exhaust gas to be recirculated is controlled by EGR valve 36. It is appreciated that embodiments of the present invention may be employed in engines with or without an EGR system.

In some embodiments, it may be desirable to provide a cooler 60 to cool the charge air coming from compressor 50. Similarly, in some embodiments, it may be desirable to provide a cooler 62 to cool the flow through the EGR system prior to reintroduction to engine 14 of the gases at intake passage 56.

Figure 2:
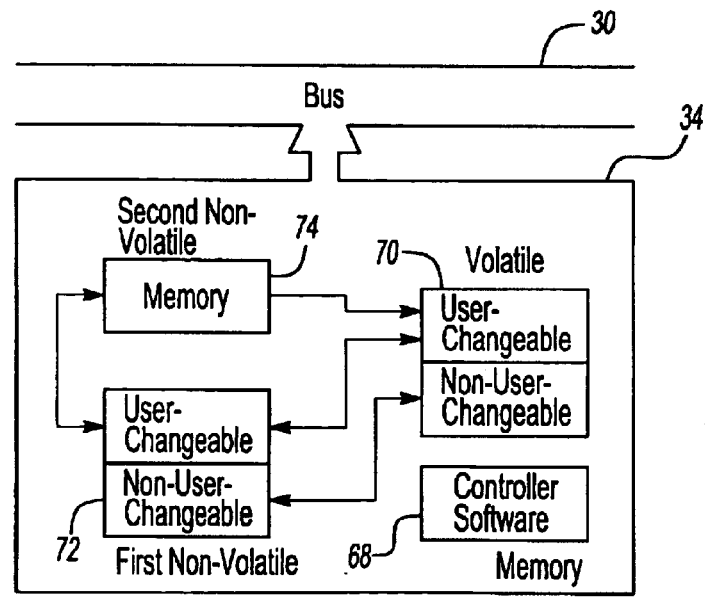
FIG. 2 illustrates a partitioning of the engine control module memory unit in accordance with the present invention.

FIG. 2 illustrates a partitioning of the engine control module memory unit 34 in accordance with the present invention. In general, the memory used by the memory unit 34 is partitioned into user-changeable and non-user-changeable portions. In addition, the memory unit 34 includes a dedicate software program 68 which controls microprocess 26 access to the separate memory or portions of memory in the memory unit 34.

The user-changeable portion relates to the calibration data that the user is permitted to modify. For example, vehicle road speed limits, cruise control parameters, engine protection data, vehicle specification data. The non-changeable portion relates to the calibration data that the user is not permitted to change. For example, fuelling maps, timing data, diagnostics, engine governing characteristics, and others as understood so those skilled in the art. Typically, the engine operation controlled by the calibration data determines whether it is user-changeable or non-user-changeable.

The partitioning permits the back up copying to be limited to only the user-changeable portions so that less memory is required. This limits memory fatigue and prolongs memory operation. In addition the partitioning permits the back up memory to be smaller as it is only required to back up the changeable portion, and not the entire memory. This limits the cost of the back up system.

The foregoing features and benefits are described below with respect to the memory unit 34 including volatile memory 70, first non-volatile memory 72, and second non-volatile memory 74. The memories 72, 74, 76 can be protected and unprotected portions of a single memory or separate memory units. This is typically controlled through the dedicated software program 68. Together, the memories 70, 72, 74 provide a redundant memory system which permit recreation of the calibration data when a non-volatile memory failure has occured, commands due to worn out memory locations.

The memory unit 34 may comprise a single memory or multiple memories which can be used by the engine control module 14, including static random access memory (SRAM), dynamic random access memory (DRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), and ferroelectric random access memory (FRAM). In addition, read only memories (ROM) having write capabilities could be used.

The calibration data stored in volatile memory 70 is used via bus 30 by engine control module 14. Non-volatile memory 72, 74 provide backup versions of the calibration data and are used to load volatile memory 70 after the engine control module 14 has rebooted.

Changes to the calibration data can be made by a user applying the changes directly to the volatile memory. The engine control module 14 copies these changes to first non-volatile memory 72 and reboots engine control module 72.

After rebooting, the changes in first non-volatile memory 72 are verified/validated by engine control module 14. This typically comprises running a checksum program, as is appreciated by one having ordinary skill in the art. The verified changes can then be copied to second non-volatile memory 74 for additional back up. Typically, the entire user-changeable portion of first non-volatile memory 72 is copied to save memory demanded for second non-volatile memory 74. Optionally, the calibration data can be compressed prior to copying to second non-volatile memory 74 to further reduce memory requirements.

If the checksum program shows that the calibration data in non-volatile memory 72 is not valid, those changes are not copied to second non-volatile memory 74. Rather, the calibration data from second non-volatile memory 74 can be copied back to first non-volatile memory 72 to overwrite the previous changes. Then, the verified back up calibration data can be copied from first non-volatile memory 72 (if now valid) to volatile memory 70. If the first copy is still not valid, the calibration data can be copied directly from second non-volatile memory 74 to volatile memory. This process allows the engine control module 14 to function normally with a valid calibration even though one memory 72, 74 has failed. A diagnostic is logged instructing the user to have the engine control module replaced when convenient to do so.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for operating an engine control module having a volatile memory and a first non-volatile memory, the engine control module operable for copying data between the memories, such as calibration data used to control operation of the engine, the method comprising:

partitioning the volatile memory and the first non-volatile memory into user-changeable and non-user-changeable portions, the portions including calibration data for use by the engine control module to control an engine; and copying only the user-changeable portion of the volatile memory to the first non-volatile memory for storage in response to changing of the calibration data stored at the volatile memory.

2. The method of claim 1 further comprising backing up the user-changeable portion of the first non-volatile memory prior to receiving the changed calibration data, the backing up comprising copying only the user-changeable portion of the first non-volatile memory to a second non-volatile memory for storage.

3. The method of claim 2 wherein the backing up comprises compressing the user-changeable portion of the first non-volatile memory prior to copying to the second non-volatile memory, the second-volatile memory correspondingly storing a compressed version of the user-changeable portion of the first non-volatile memory.

4. The method of claim 2 further comprising verifying the calibration instruction copied to the first non-volatile memory prior to backing up the calibration data to the second non-volatile memory.

5. The method of claim 4 further comprising copying to the volatile memory in response to rebooting of the engine control module one of (i) the user-changeable and non-user-changeable portions of the first non-volatile memory or (ii) the entire second non-volatile memory and the non-user-changeable portion of the first non-volatile memory.

6. The method of claim 5 wherein the user-changeable and non-user-changeable portions of the first non-volatile memory is copied to the volatile memory if the first non-volatile memory is without defects.

7. The method of claim 5 wherein the entire second non-volatile memory and the non-user-changeable portion of the first non-volatile memory are copied to the volatile memory if the first non-volatile memory is defective.

8. The method of claim 5 further comprising uncompressing the entire second non-volatile memory if copied to the volatile memory.

9. The method of claim 1 wherein partitioning the memory comprises predefining which portions of the memory includes data which may be changed based on the engine operation controlled by the data.

10. A method for limiting memory failure of a engine control module, the method comprising:

partitioning a volatile memory and a first non-volatile memory of the engine control module into user-changeable and non-user-changeable portions, the portions including calibration data for use by the engine control module to control an engine; and copying only the user-changeable portion of the volatile memory to the user-changeable portion of the first non-volatile memory in response to changing of the calibration data stored at the volatile memory to limit memory failure due to repeatedly copying the calibration data to the first non-volatile memory.

11. The method of claim 10 further comprising backing up the user-changeable portion of the first non-volatile memory prior to receiving the changed calibration data, the backing up comprising copying only the user-changeable portion of the first non-volatile memory to a second non-volatile memory for storage.

12. The method of claim 11 wherein the backing up comprises compressing the user-changeable portion of the first non-volatile memory prior to copied to the second non-volatile memory, the second-volatile memory correspondingly storing a compressed version of the user-changeable portion of the first non-volatile memory.

13. The method of claim 11 further comprising verifying the calibration instruction copied to the first non-volatile memory prior to backing up the calibration data to the second non-volatile memory.

14. The method of claim 13 further comprising copying to the volatile memory in response to rebooting of the engine control module one of (i) the user-changeable and non-user-changeable portions of the first non-volatile memory or (ii) the entire second non-volatile memory and the non-user-changeable portion of the first non-volatile memory.

15. The method of claim 14 wherein the user-changeable and non-user-changeable portions of the first non-volatile memory is copied to the volatile memory if the first non-volatile memory is without defects.

16. The method of claim 14 wherein the entire second non-volatile memory and the non-user-changeable portion of the first non-volatile memory are copied to the volatile memory if the first non-volatile memory is defective.

17. The method of claim 14 further comprising uncompressing the entire second non-volatile memory if copied to the volatile memory.

18. The method of claim 10 wherein partitioning the memory comprises predefining which portions of the memory include data which may be changed based on the engine operation controlled by the data.

19. An engine control module for controlling an internal combustion engine, the engine control module comprising:

a processor for executing instruction to control the engine;

a first non-volatile memory having first and second partitions, the first partition storing engine calibration data classified as user-changeable, the second partition storing engine calibration data classified a non-user-changeable;

a volatile memory that is loaded with the contents of both the first and second non-volatile memory partitions at reset of the engine control module such that the engine control module operates using the volatile memory wherein the processor executes data to control the engine in accordance with the user-changeable and non-user-changeable parameters;

wherein, in response to the changing of the user-changeable engine calibration data in the volatile memory, the engine controller is configured to copy only the user-changeable engine calibration data from the volatile memory to the first partition of the first non-volatile memory.

20. The engine control module of claim 19 further comprising a second non-volatile memory, the engine control module configured to verify the changes to the changed first-partition and to copy the changed first partition of the non-volatile memory to the second non-volatile memory if the changes are verified.

* * * * *